(12) United States Patent
Herb et al.

(10) Patent No.: US 6,401,052 B1
(45) Date of Patent: Jun. 4, 2002

(54) DETERMINATION METHOD FOR A POSITION SIGNAL AND/OR FOR CORRECTION VALUES FOR MEASUREMENT SIGNALS

(75) Inventors: Robert Herb, Offenbach; Wolfgang Papiernik, Neunkirchen; Bernhard Hoescheler, Erlangen, all of (DE)

(73) Assignee: Siemens Aktiengesellschaft, Munich (DE)

( * ) Notice: Subject to any disclaimer, the term of this patent is extended or adjusted under 35 U.S.C. 154(b) by 78 days.

(21) Appl. No.: 09/629,336

(22) Filed: Aug. 1, 2000

(30) Foreign Application Priority Data

Aug. 2, 1999 (DE) ............................. 199 35 593
Jul. 17, 2000 (DE) ............................. 100 34 733

(51) Int. Cl.$^7$ .......................... G06F 15/00; G01B 5/00
(52) U.S. Cl. ..................... 702/150; 702/151; 702/36; 356/498; 356/617
(58) Field of Search ................ 702/150, 151, 702/158, 163, 35–36; 356/498–500, 614–617; 318/437, 807, 809; 327/47, 50

(56) References Cited

U.S. PATENT DOCUMENTS

| | | | |
|---|---|---|---|
| 4,229,647 A | * 10/1980 | Burkhardt | ...................... 377/3 |
| 4,573,000 A | * 2/1986 | Nelle | .......................... 318/640 |
| 4,776,698 A | * 10/1988 | Crosdale | ..................... 356/493 |
| 5,285,144 A | * 2/1994 | Hsu et al. | ................... 318/807 |
| 5,438,330 A | * 8/1995 | Yamazaki et al. | ............ 341/11 |

OTHER PUBLICATIONS

B. Höscheler and L. Szamel, "Innovative technique for easy high–resolution position acquisition with sinusoidal incremental encoders," PCIM 97 Europe, Intelligent Motion, Conference Porceedings, vol. 31, pp. 407–416.

* cited by examiner

*Primary Examiner*—Bryan Bui
(74) *Attorney, Agent, or Firm*—Kenyon & Kenyon

(57) ABSTRACT

In incremental detectors, measurement signals thereof are first corrected in graduation-specific fashion with respect to amplitude offsets, and phase displacement, and a rough angle is determined. The residual error of the rough angle is fine-corrected via rough-angle-specific, graduation-independent rough angle correction values and a position signal is determined in this way. The correction values for amplitudes offsets, and phase displacement are determined using regression, and the rough angle correction values are determined using high-precision reference angle measurements.

15 Claims, 5 Drawing Sheets

DETERMINATION METHOD FOR A POSITION SIGNAL AND/OR FOR CORRECTION VALUES FOR MEASUREMENT SIGNALS

FIELD OF THE INVENTION

The present invention relates to a determination method for a position-signal. In particular. two primary detectors scan a material measure that can be moved relative to the primary detectors. The measure material has a plurality of graduations that are arranged equidistant from one another. The primary detectors supply measurement signals corresponding thereto.

The measurements signals are periodic, given uniform relative motion of the material measure. The measurement signals are also sinusoidal, and are phase-displaced relative to one another by 90°. The material measure executing a relative motion of one graduation during one period of the measurement signals.

An updating takes place concerning the graduation to which the determined measurement signals are currently to be allocated.

A rough angle is determined from the measurement signals, on the basis of amplitudes and offsets of the measurement signals.

A position angle is determined inside the graduation to which the determined measurement signals are currently allocated. The position angle is determined on the basis of predetermined rough angle correction values that are specific to the rough angle and that are independent of the graduation.

The position signal is determined from the position angle and from the graduation to which the determined measurement signals are currently allocated.

In addition, the present invention relates to a determination method for the corresponding correction values.

BACKGROUND INFORMATION

Determination methods of this sort are described in, for example, B. Höscheler and L. Szamel, "Innovative technique for easy high-resolution position acquisition with sinusoidal incremental encoders," PCIM 97 Europe, Intelligent Motion, Conference Proceedings, vol. 31.

This article describes the determination of a position angle, and then therefrom the position signal, from the rough angle on the basis of predetermined rough angle correction values that are specific to the rough angle and that are independent of the graduation. The correction of the offset and amplitude of the measurement signals is mentioned only in passing.

SUMMARY

An object of the present invention is to provide a determination method for a position signal, or a corresponding determination method for correction values for measurement signals.

For the determination method for the position signal, this object is achieved in that in the determination of the rough angle a phase displacement (differing by 90° if necessary) of the measurement signals relative to one another is also taken into account. The amplitudes and offsets of the measurement signals, as well as the phase displacement of the measurement signals relative to one another, are predetermined in a graduation-specific manner.

For the determination method for correction values for measurement signals, the object is achieved in that
the measurement signal correction values also include a fundamental value for a phase displacement of the then-acquired measurement signals relative to one another,
and the measurement signal correction values are determined and stored in a graduation-specific manner.

The graduation-specific intermediate correction values are determined on the basis of the measurement signals acquired for this graduation, and on the basis of the measurement signal correction values determined for this graduation.

The determination method for the position signal operates fairly well when the amplitudes, the offsets and/or the phase displacement within the graduation to which the determined measurement signals are currently allocated are independent of the measurement signals.

However, it works even better if a preliminary angle is determined on the basis of the measurement signals, and the amplitudes, the offsets, and/or the phase displacement within the graduation to which the determined measurement signals are currently allocated are dependent on the preliminary angle.

Corresponding to this, in the determination method for the correction values, the measurement signal correction values also include modification values for the amplitudes, the offsets, and/or the phase displacement of the then-acquired measurement signals, so that the amplitudes, the offsets, and/or the phase displacement within the graduation to which the then-acquired measurement signals are allocated depend on a preliminary angle, which is determined on the basis of the then-acquired measurement signals.

Since the correction values change only slightly from graduation to graduation, it is sufficient if the amplitudes, the offsets, and/or the phase displacement depend on the preliminary angle in linear fashion.

In this way, the fundamental values and modification values define linear functions section-by-section. The fundamental values and the modification values of adjacent graduations are determined in such a way that a continuous transition for the amplitudes, the offsets, and/or the phase displacement results between the adjacent graduations.

The determination method for the correction values works particularly well if the material measure moves only slowly during the scanning.

Particularly good measurement signal correction values result if, per graduation, the measurement signals acquired for this graduation are essentially uniformly distributed in the period allocated to this graduation.

Optionally, the determination method for the correction values can be executed before the determination of position signals, or else can be executed in the background during the determination of the position signals, parallel thereto. In the latter case, the incremental detector evaluation system constantly updates itself automatically. Optimized correction values are thus available for later measurements.

DETAILED DESCRIPTION

Figure 1:
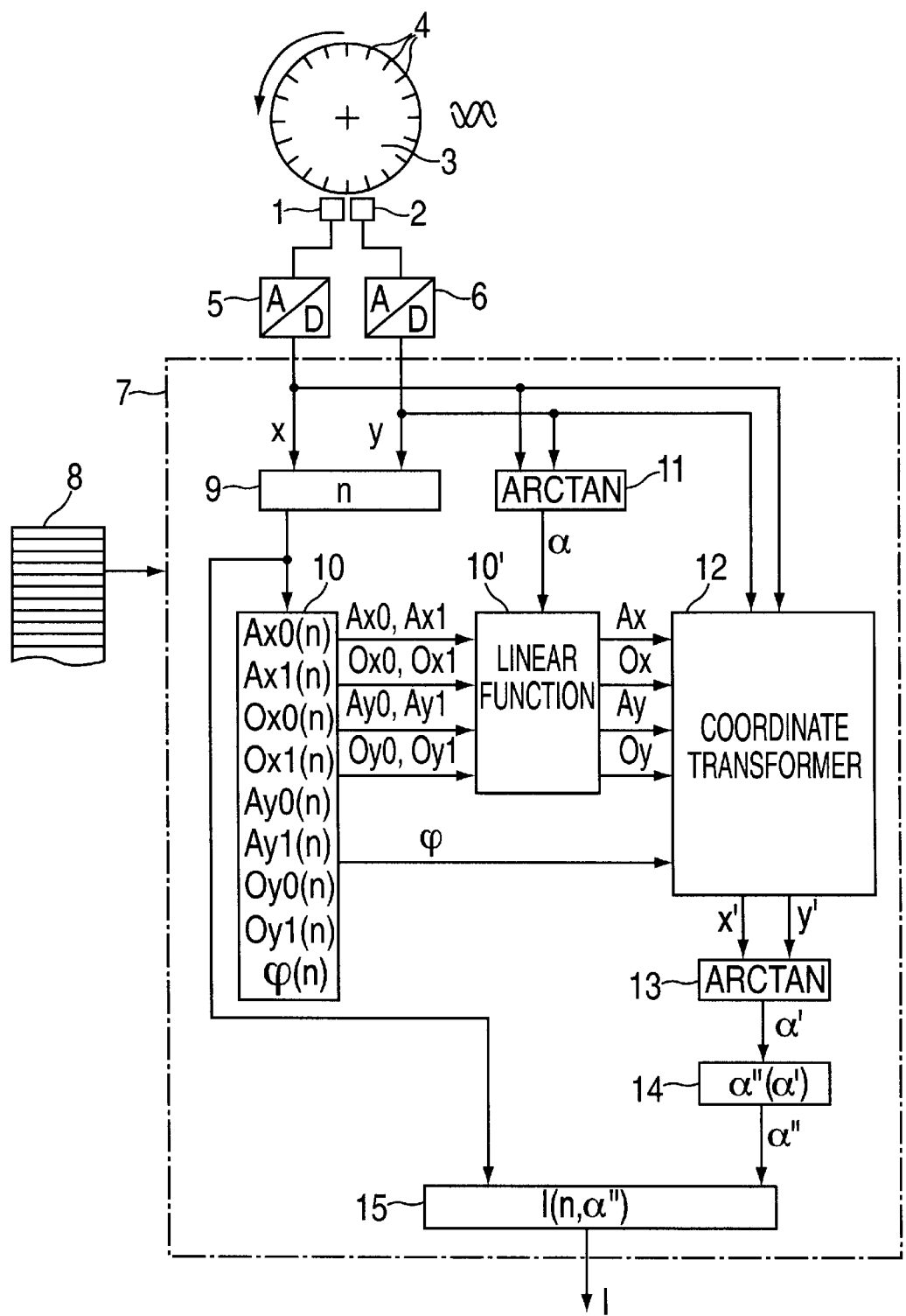
FIG. 1 shows an incremental detector system.

As shown in FIG. 1, an incremental detector system includes two primary detectors 1,2, as well as a material measure 3. A multiplicity of graduations 4 is arranged in equidistant fashion on material measure 3. Material measure 3 can be moved relative to primary detectors 1,2; in the present case by rotation. However, a relative sliding or displacement would also be possible.

Primary detectors 1,2 scan material measure 3. Their output signals are digitized, for example with 12 bits, in A/D converters 5,6, and, as digitized measurement signals x, y, are supplied to an incremental detector evaluation system 7. In the present case, incremental detector evaluation system 7 is realized as software. A computer program product 8 that determines the manner of operation of incremental detector evaluation system 7 is thus being executed.

As described above, primary detectors 1,2 both scan the same material measure 3. As a result of the equidistant arrangement of graduations 4, given uniform motion of material measure 3 both measurement signals x, y are periodic. Here, one period of measurement signals x, y corresponds to a relative motion of material measure 3 by one graduation 4. In addition, measurement signals x, y are sinusoidal, and, due to the arrangement and construction of primary detectors 1,2, are phase-displaced by 90° relative to one another.

In the ideal case, measurement signals x, y are completely free of offset (offset Ox=offset Oy=0), have equal amplitudes Ax, Ay, are exactly sinusoidal given uniform motion of material measure 3, and are phase-displaced to one another by exactly 90°. Measurement signals x, y are therefore often also called cosine and sine signals. In practice, however, the phase displacement (designated $\phi$ in the following) is only approximately 90°. In addition, amplitudes Ax, Ay of measurement signals x, y are variable and different from one another. The same is true of offsets Ox, Oy of measurement signals x, y.

The deviations of amplitudes Ax, Ay, of offsets Ox, Oy, and of phase displacement $\phi$ lead to errors in the calculation of a position 1 on the basis of supplied measurement signals x, y.

For correction, measurement signals x, y are therefore first supplied to a graduation determination unit 9, which in a conventional manner updates the information concerning the graduation 4 to which determined measurement signals x, y are to be allocated. Given slow movement of material measure 3, this can take place by simple edge evaluation of measurement signals x, y. Given faster motion of material measure 3, and taking into account the change of speed between two measurements (which is only very slight), from the calculable speed of material measure 3 it is determined to which graduation 4 measurement signals x, y must henceforth be allocated. If necessary, a correction of graduation 4 up or down by 1 takes place on the basis of measurement signals x, y. This is a known procedure.

Graduation determination unit 9 therefore determines an index n that is characteristic for the graduation 4 to which currently determined measurement signals x, y are to be allocated. Corresponding to index n, a multiplicity of values is called from a first correction value memory 10. At a minimum, fundamental values Ax0, Ay0, Ox0, Oy0 for amplitudes Ax, Ay, and offsets Ox, Oy of measurement signals x, y, as well as phase displacement $\phi$, are called. As long as only fundamental values Ax0, Ay0, Ox0, Oy0, $\phi$ are taken into account, amplitudes Ax, Ay, offsets Ox, Oy, and phase displacement $\phi$ within the graduation 4 to which determined measurement signals x, y are currently allocated are independent of measurement signals x, y. This procedure already leads to fairly acceptable results. However, in order to increase precision, modification values Ax1, Ay1, Ox1, Oy1 for amplitudes Ax, Ay and offsets Ox, Oy of measurement signals x, y are also called. Modification values Ax1, Ay1, Ox1, Oy1 are multiplied by a preliminary angle $\alpha$—which was calculated in an angle determination unit 11 on the basis of measurement signals x, y—in a coefficient determination unit 10'. The products are then added to respective fundamental values Ax0, Ay0, Ox0, Oy0. Linear functions—or general functions depending on preliminary angle $\alpha$—are thus formed that yield corresponding amplitudes Ax, Ay and offsets Ox, Oy. In contrast, phase displacement $\phi$ remains unmodified within respective graduation 4.

Amplitudes Ax, Ay, offsets Ox, Oy, and phase displacement $\phi$ define a transformation rule, with which measurement signals x, y are transformed into intermediate signals x', y'. This transformation takes place in a coordinate transformation unit 12. The intermediate signals are supplied to an angle determination unit 13, which determines a rough angle $\alpha'$ on the basis of intermediate signals x', y'.

Rough angle $\alpha'$ is supplied to a second correction value memory 14. There, using a look-up table, i.e. using predetermined rough angle correction values $\alpha''$ ($\alpha'$) specific to the rough angle, a position angle $\alpha''$ is determined from the rough angle $\alpha'$ within graduation 4 to which measurement signals x, y are allocated. In this context, rough angle correction values $\alpha''$ ($\alpha'$) are graduation-independent.

The very precise position angle $\alpha''$ determined in this way is supplied, together with index n, to a position determination unit 15, which determines position 1 therefrom in a conventional manner.

Figure 2:
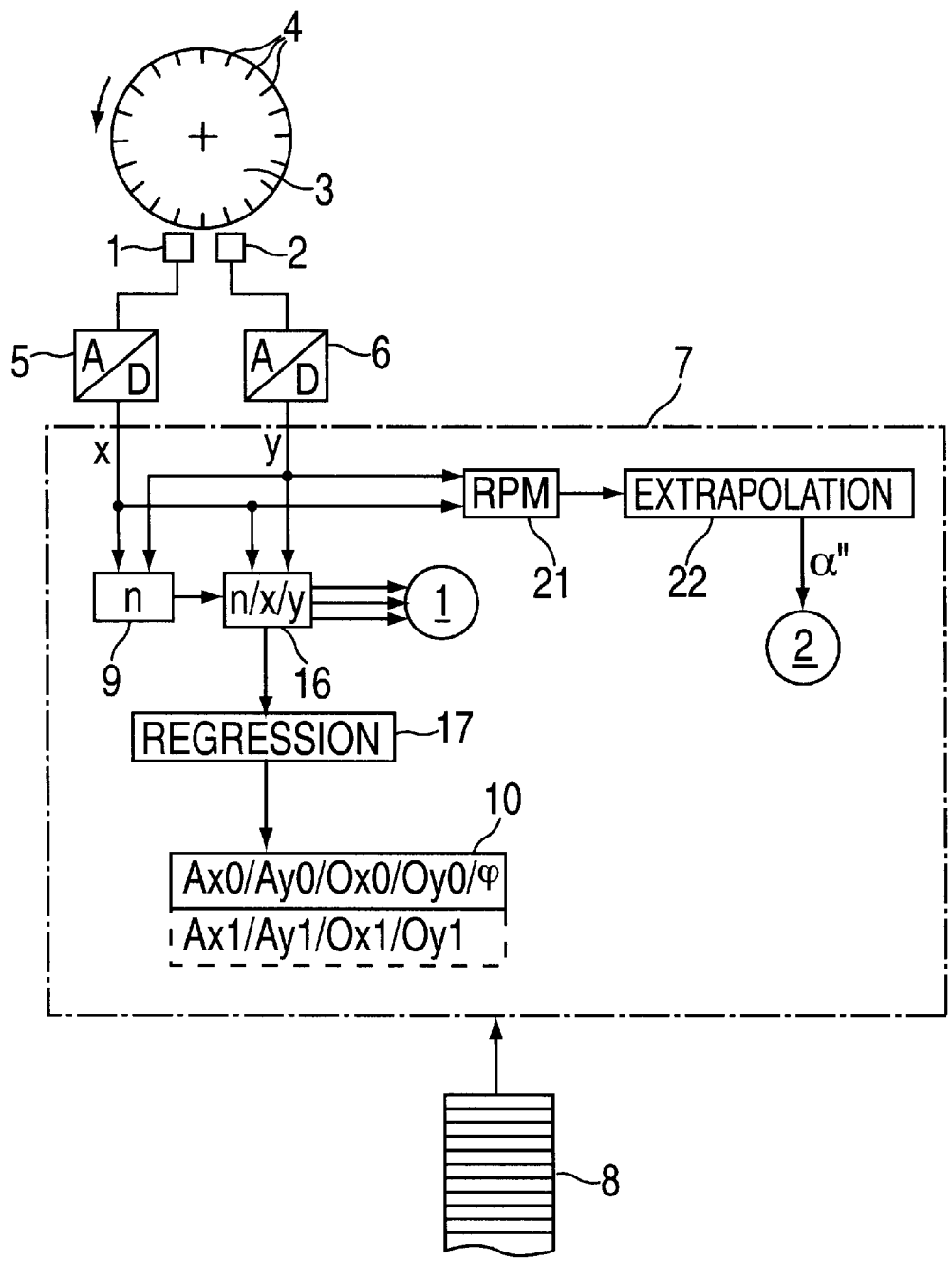
FIGS. 2 and 3 an additional incremental detector system.
Figure 3:
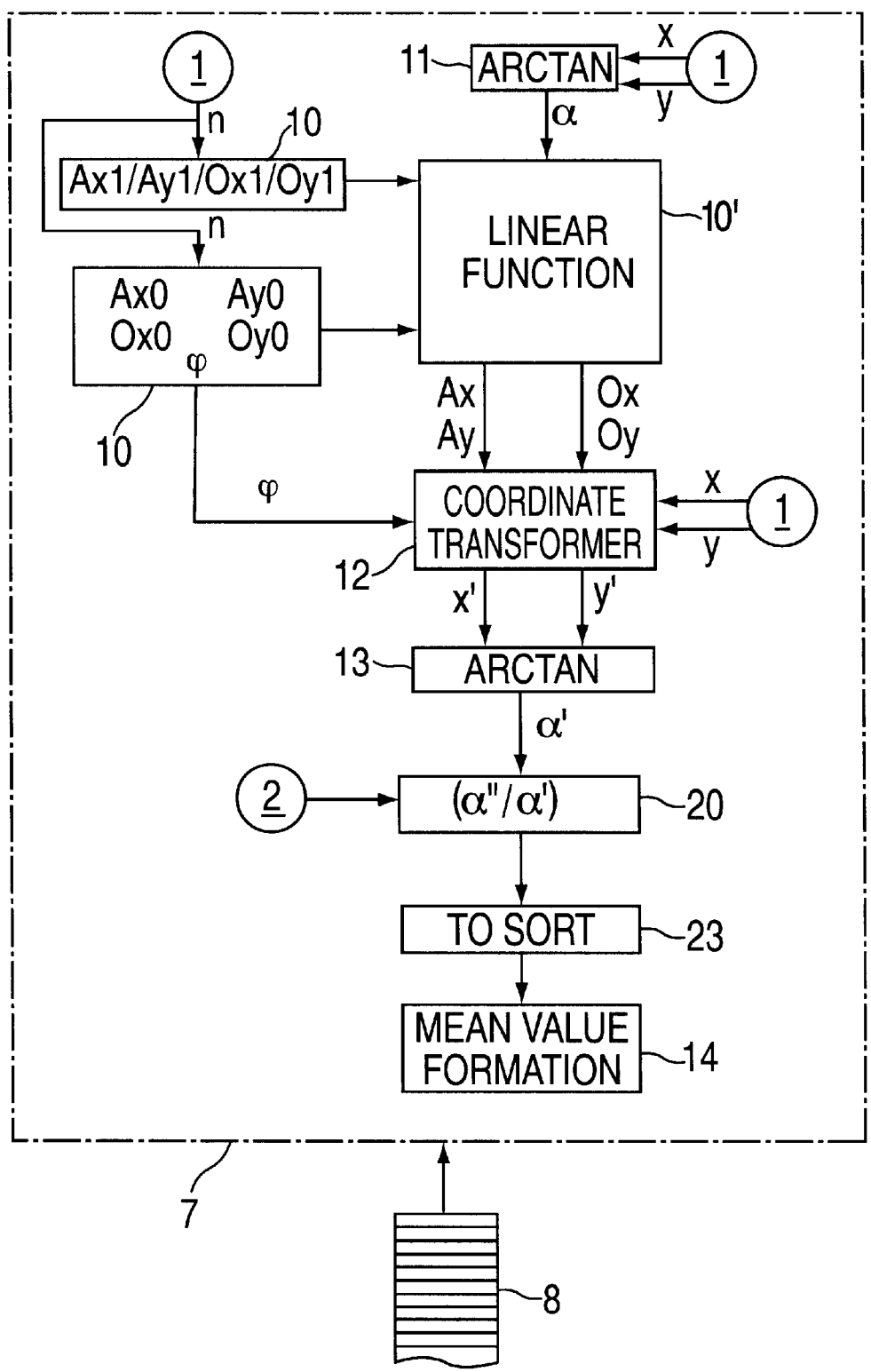

Above, the compensation of signal errors in correction values Ax0, Ay0, Ox0, Oy0, Ax1, Ay1, Ox1, Oy1, $\phi$ was described. In the following, in connection with FIGS. 2 and 3 it is described how these correction values Ax0, Ay0, Ox0, Oy0, Ax1, Ay1, Ox1, Oy1, $\phi$ can be determined. In this context, identical elements in FIGS. 2 and 3 are provided with the same reference characters.

As above, material measure 3 is moved relative to primary detectors 1,2, and measurement signals x, y are acquired. Here, however, material measure 3 is moved only slowly. This is indicated in FIG. 2 in that the arrow at material measure 3 is significantly shorter than the arrow in FIG. 1.

At the same time, measurement signals x, y are acquired as quickly as possible. In this way, it is achieved that for each graduation 4 a multiplicity of measurement signals x, y is determined, and the measurement signals x, y acquired for a graduation 4 are uniformly distributed in the period allocated to this graduation 4 (same index n). Measurement signals x, y are written into an intermediate memory 16 together with index n. Intermediate memory 16 is dimensioned such that at least all measurement signals x, y of one period can be stored therein.

Figure 4:
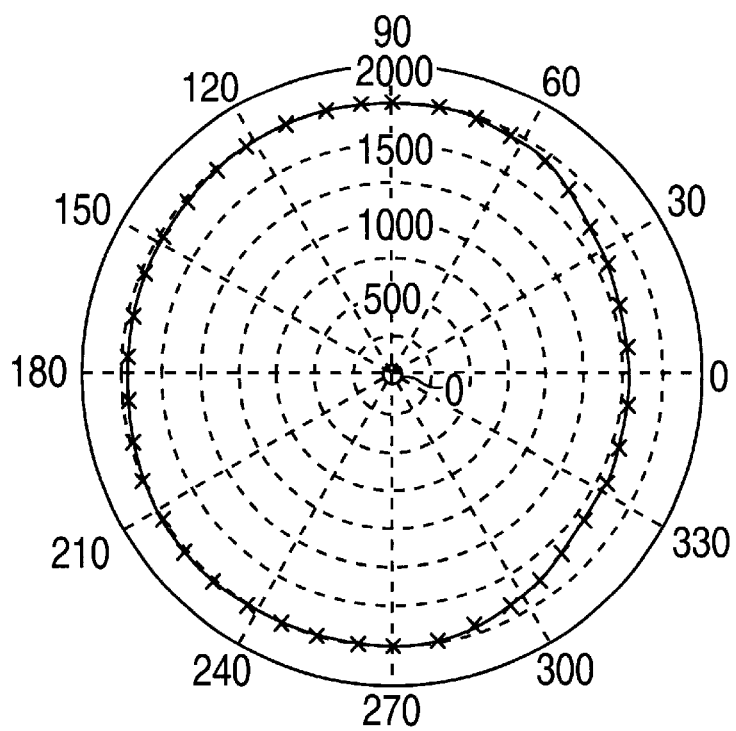
FIGS. 4 to 6 Lissajous figures.

In FIG. 4, as an example measurement signals x, y of one period are shown. Here the one measurement signal x is shown at the right and the other measurement signal y is shown at the top. The small crosses correspond to the acquired measurement signal pairs, and the solid lines correspond to a linear interpolation between each two support points.

Per graduation 4, measurement signals x, y acquired for this graduation 4 are supplied to a regression filter 17. On the basis of measurement signals x, y, this filter first determines fundamental values Ax0, Ay0, Ox0, Oy0, $\phi$ for this graduation 4, and stores them in first correction value memory 10. Given a later acquisition of measurement signals x, y, these fundamental values Ax0, Ay0, Ox0, Oy0, $\phi$ are thus available for the correction of then-acquired measurement signals x, y, and are thus available for calculation of rough angle $\alpha'$.

The determination of fundamental values Ax0, Ay0, Ox0, Oy0, $\phi$ takes place as follows:

First it is assumed that measurement signals x, y can be represented as follows:

x=Ox0+Ax0 cos ($\alpha+\delta$), and y=Oy0+Ay0 sin $\alpha$.

Coefficients Ax0, Ay0, Ox0, Oy0, $\delta$ define an ellipse. Here $\delta$ is the deviation of phase displacement $\phi$ from 90°. This ellipse can also be represented in the general conic section equation $ax^2+2bxy+cy^2+2dx+2ey+f=0$. Here parameters a to f have the following values:

a=Ay0$^2$ b=Ax0 $^-$Ay0 sin $\delta$ c=Ax0$^2$ d=−Ay0(Ox0 Ay0+Ax0 Oy0 sin $\delta$)

e=−Ax0(Ax0 Oy0+Ay0 Ox0 sin $\delta$)

f=(Ox0 Oy0+Ax0 Ay0 sin $\delta$)$^2$+(OX0$^2$−Ay0$^2$)(Ax0$^2$−Oy0$^2$).

Measurement signals x, y are now transformed into polar coordinates. They are thus written as x=r cos $\alpha$ and y=r sin $\alpha$. Here r results from the equation $r^2=x^2+y^2$, and in the following is designated pointer length r.

If these formulas for measurement signals x, y are placed into the general conic section equation, one obtains a quadratic equation for pointer length r, which can be solved for pointer length r. A condition is thus obtained for pointer length r as a function of preliminary angle $\alpha$, in which the above-cited fundamental values Ax0, Ay0, Ox0, Oy0 occur as parameters. Using a non-linear regression, the five fundamental values Ax0, Ay0, Ox0, Oy0, $\phi$ can thus be optimized. These values, determined in this way, are then stored in first correction value memory 10. The fact that measurement signals x, y acquired for this graduation 4 are uniformly distributed in the period allocated to this graduation 4 has the consequence that higher-frequency disturbances in the determination of fundamental values Ax0, Ay0, Ox0, Oy0, $\phi$ are essentially averaged out.

The above-described procedure for determining the fundamental values is now carried out successively for all graduations 4, so that these values are available for all graduations 4.

In principle, amplitude Ax can also be a higher-valued function of preliminary angle $\alpha$. For example, within respective graduation 4, it can depend, in linear fashion, on preliminary angle $\alpha$, thus yielding Ax=Ax0+$\alpha$Ax1. The same holds for the other amplitude Ay and offsets Ox, Oy. In this case as well, the corresponding conic section equation is determined, fundamental values Ax0, Ay0, Ox0, Oy0 are replaced by the corresponding preliminary-angle-dependent functions. Measurement signal correction values Ax0, Ax1, Ay0, Ay1, Ox0, Ox1, Oy0, Oy1, $\phi$ can then, as previously, also be determined by a non-linear regression. If necessary, a subsequent correction also takes place, such that fundamental values and modification values Ax0, Ax1, Ay0, Ay1, Ox0, Ox1, Oy0, Oy1, $\phi$ define in segment-by-segment fashion, as a function of preliminary angle $\alpha$, linear functions that move continuously into one another between adjacent graduations 4. As shown in broken lines in FIG. 2, modification values Ax1, Ay1, Ox1, Oy1 are likewise stored in first correction value memory 10.

Figure 5:
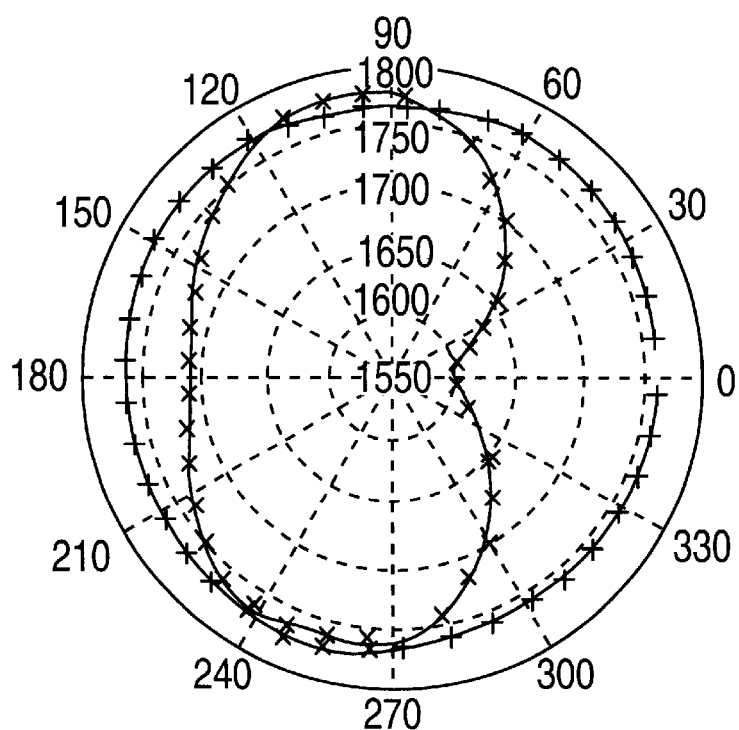

If all measurement signal correction values Ax0, Ax1, Ay0, Ay1, Ox0, Ox1, Oy0, Oy1, $\phi$ are now present, intermediate signals x', y' are now again determined, in a manner analogous to the procedure according to FIG. 1. These intermediate signals x', y' are shown in FIG. 5, together with measurement signals x, y, in a scale that is enlarged in relation to FIG. 4. The circle-like figure in FIG. 5 represents the curve of intermediate signals x', y', and the approximately kidney-shaped curve represents the curve of measurement signals x, y. It can be seen that a significantly improved position evaluation is already possible on the basis of the adaptation of amplitudes Ax, Ay, of offsets Ox, Oy, and of phase displacement $\phi$.

Figure 6:
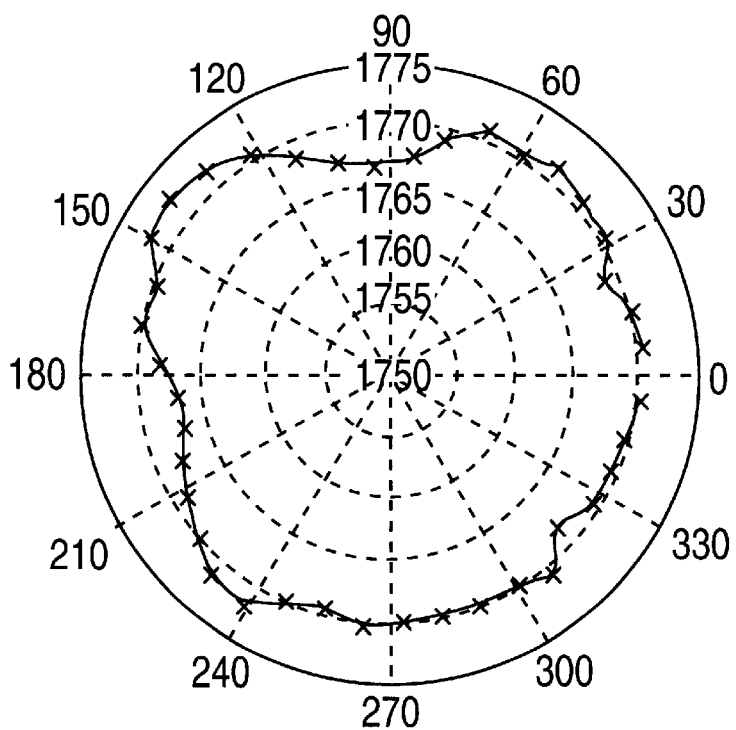

FIG. 6 shows, in a further-enlarged representation, intermediate signals x', y'. Typical harmonics (minima at approximately 0°/90°/180°/270°) can first be recognized in this representation, alongside unavoidable measurement noise. These residual errors are only slight, but they can also be corrected.

Figure 7:
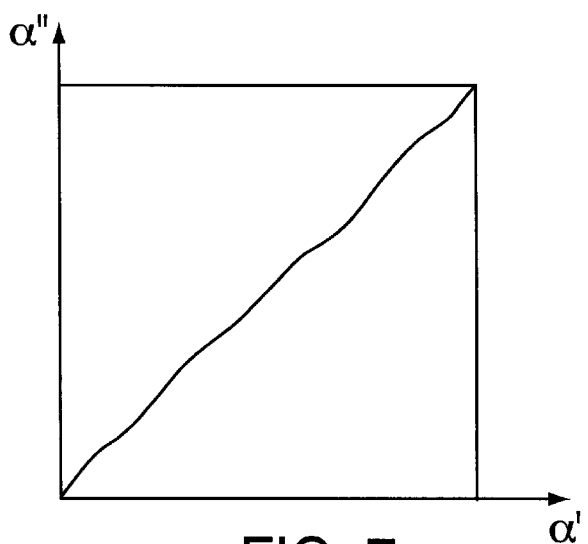
FIG. 7 shows a graduation-independent correction value curve.

For this purpose, on the one hand—likewise as described above in connection with FIG. 1—rough angle $\alpha'$ can be determined according to FIG. 3, and supplied to a second intermediate memory 20. In addition, position angle $\alpha''$ is supplied to second intermediate memory 20. This position angle was determined using an RPM generator 21 with subsequently arranged extrapolator 22, for example on the basis of a plurality of successive zero transitions of measurement signals x, y. The stored value pairs of position angle $\alpha''$ and rough angle $\alpha'$ form graduation-dependent intermediate correction values ($\alpha''/\alpha'$) for rough angle $\alpha'$. Intermediate correction values ($\alpha''/\alpha'$) are shown schematically in FIG. 7. They are sorted in a sorting unit 23 according to equidistant values of rough angle $\alpha'$ and are stored in second correction value memory 14. Mean value formation takes place there, over all graduations 4, of all intermediate correction values ($\alpha''/\alpha'$) stored in second correction value memory 14. Rough angle correction values $\alpha''$ ($\alpha'$), calculated by mean value formation, are thus graduation-independent.

The above-described determination method for correction values Ax0, Ax1, Ay0, Ay1, Ox0, Ox1, Oy0, Oy1, $\phi$, $\alpha''$ ($\alpha'$) can be carried out ahead of time. In this case, correction values Ax0, Ax1, Ay0, Ay1, Ox0, Ox1, Oy0, Oy1, $\phi$, $\alpha''$ ($\alpha'$) are stored as fixed values in correction value memories 10, 14. Preferably, however, the determination method is executed in the background, parallel to the determination of position signal 1.

Using the determination method according to the present invention, given an A/D conversion of 12 bits and a theoretically achievable resolution limit of 1/100 connected therewith, a resolution of 1/5900 of a detector period can be achieved. This high resolution is achieved here in particular due to the taking into account of the phase displacement $\phi$ in the correction of the measurement signal error.

What is claimed is:

1. A method for determining a position signal, comprising:

scanning a material measure using two primary detectors, the material measure being moved relative to the primary detectors, the material measure having graduations that are arranged equidistant from one another, the primary detectors providing measurement signals corresponding to the graduations, the measurement signals being periodic, given uniform relative motion of the material measure, and being sinusoidal, the measurement signals further being phase-displaced by 90° relative to one another, the material measure executing a relative motion of one graduation during one period of the measurement signals, an updating taking place concerning the graduation to which the measurement signals are currently allocated;

determining a rough angle from the measurement signals as a function of predetermined graduation-specific amplitudes and offsets of the measurement signals, and as a function of a phase displacement of the measurement signals relative to one another;

determining a position angle inside the graduation to which the measurement signals are currently allocated, the position angle being determined from the rough angle as a function of predetermined rough angle corrections values that are specific to the rough angle and that are independent of the graduation; and determining the position signal from the position angle and the graduation to which the determined measurement signals are currently allocated.

2. The method according to claim 1, wherein at least one of the amplitudes, the offsets and the phase displacement within the graduation to which the determined measurement signals are currently allocated are independent of the measurement signals.

3. The method according to claim 1, further comprising:

determining a preliminary angle as a function of the measurement signals, wherein the at least one of the amplitudes, the offsets and the phase displacement within the graduation to which the determined measurement signals are currently allocated depend on the preliminary angle.

4. The method according to claim 3, wherein the at least one of the amplitudes, the offsets and the phase displacement within the graduation to which the determined measurement signals are currently allocated depend, in linear fashion, on the preliminary angle.

5. A method for determining correction values for measurement signals, comprising:

scanning a material measure using two primary detectors, the material measure being moved relative to the primary detectors, the material measure having a graduations that are arranged equidistant from one another, the primary detectors providing measurement signals corresponding to the graduations, the measurement signals being periodic, given uniform relative motion of the material measure, and being sinusoidal, the measurement signals further being phase-displaced by 90° relative to one another, the material measure executing a relative motion of one graduation during one period of the measurement signals, an updating taking place concerning the graduation to which the measurement signals are currently allocated;

determining and storing measurement signal correction values per graduation as a function of the measurement signals acquired for this graduation so that given a later acquisition of measurement signals, a position angle within a then-scanned graduation is determined as a function of a then-determined rough angle and the intermediate correction values; and determining graduation-specific and rough-angle-specific intermediate correction values per graduation as a function of the measurement signals acquired for this graduation and as a function of the measurement signal correction values so that given the later acquisition of measurement signal, a position angle within the then-scanned graduation can be determined as a function of the then-determined rough angle and as a function of the intermediate correction values;

determining rough angle correction values that are rough-angle specific and graduation dependent as a function of the intermediate correction values so that given the later acquisition of measurement signals, as a function of the then-determined measurement signals and of a graduation to which the then-determined measurement signals are allocated, as a function of the measurement signal correction values and the rough angle correction values, the position angle can be determined within the graduation to which the then-acquired measurement signals are allocated, and a position signal can be determined from the position angle and the graduation to which the then-acquired measurement signals are allocated, the measurement signal correction values including at least graduation-specific fundamental values for amplitudes and offsets of the then-acquired measurement signals, and a phase displacement of the then-acquired measurement signals relative to one another.

6. The method according to claim 5, wherein the material measure moves only slowly during the scanning.

7. The method according to claim 5, wherein per graduation, the measurement signals acquired for this graduation are uniformly distributed in a period allocated to this graduation.

8. The method according to claim 5, wherein the rough angle correction values are determined as a function of the intermediate correction values of the graduations by mean value formulation.

9. The method according to claim 5, wherein the measurement signal correction values include modification values for at least one of the amplitudes, the offsets and the phase displacements of the then-acquired measurement signals so that the at least one of the amplitudes, the offsets and the phase displacements with the graduation to which the then-acquired measurement signals are allocated depend on a preliminary angle that is determined as a function of the then-acquired measurement signals.

10. The method according to claim 9, wherein the fundamental values and the modification values define linear functions segment-by-segment.

11. The method according to claim 9, wherein the fundamental values and the modification values of adjacent graduations are determined so that between the adjacent graduations a continuous transition results for at least one of the amplitudes, the offsets and the phase displacements.

12. The method according to claim 5, wherein the method for determining correction values for measurement signals is carried out in parallel with a method for determining a position signal.

13. A set of instructions residing in a storage medium, the set of instructions capable of being executed by a processor to implement a method for determining a position signal comprising:

scanning a material measure using two primary detectors, the material measure being moved relative to the primary detectors, the material measure having graduations that are arranged equidistant from one another, the primary detectors providing measurement signals corresponding to the graduations, the measurement signals being periodic, given uniform relative motion of the material measure, and being sinusoidal, the measurement signals further being phase-displaced by 90° relative to one another, the material measure executing a relative motion of one graduation during one period of the measurement signals, an updating taking place concerning the graduation to which the measurement signals are currently allocated;

determining a rough angle from the measurement signals as a function of predetermined graduation-specific amplitudes and offsets of the measurement signals, and as a function of a phase displacement of the measurement signals relative to one another;

determining a position angle inside the graduation to which the measurement signals are currently allocated, the position angle being determined from the rough angle as a function of predetermined rough angle corrections values that are specific to the rough angle and that are independent of the graduation; and determining the position signal from the position angle and the graduation to which the determined measurement signals are currently allocated.

14. An incremental detector evaluation system, the system configured to perform a method for determining correction values for measurement signals comprising:

scanning a material measure using two primary detectors, the material measure being moved relative to the primary detectors, the material measure having graduations that are arranged equidistant from one another, the primary detectors providing measurement signals corresponding to the graduations, the measurement signals being periodic, given uniform relative motion of the material measure, and being sinusoidal, the measurement signals further being phase-displaced by 90° relative to one another, the material measure executing a relative motion of one graduation during one period of the measurement signals, an updating taking place concerning the graduation to which the measurement signals are currently allocated;

determining and storing measurement signal correction values per graduation as a function of the measurement signals acquired for this graduation so that given a later acquisition of measurement signals, a position angle within a then-scanned graduation is determined as a function of a then-determined rough angle and the intermediate correction values; and determining graduation-specific and rough-angle-specific intermediate correction values per graduation as a function of the measurement signals acquired for this graduation and as a function of the measurement signal correction values so that given the later acquisition of measurement signal, a position angle within the then-scanned graduation can be determined as a function of the then-determined rough angle and as a function of the intermediate correction values;

determining rough angle correction values that are rough-angle specific and graduation dependent as a function of the intermediate correction values so that given the later acquisition of measurement signals, as a function of the then-determined measurement signals and of a graduation to which the then-determined measurement signals are allocated, as a function of the measurement signal correction values and the rough angle correction values, the position angle can be determined within the graduation to which the then-acquired measurement signals are allocated, and a position signal can be determined from the position angle and the graduation to which the then-acquired measurement signals are allocated, the measurement signal correction values including at least graduation-specific fundamental values for amplitudes and offsets of the then-acquired measurement signals, and a phase displacement of the then-acquired measurement signals relative to one another.

15. An incremental detector evaluation system, the system being programmed using a set of instructions residing in a storage medium, the set of instructions being executed by the incremental detector evaluation system to perform the step of:

scanning a material measure using two primary detectors, the material measure being moved relative to the primary detectors, the material measure having graduations that are arranged equidistant from one another, the primary detectors providing measurement signals corresponding to the graduations, the measurement signals being periodic, given uniform relative motion of the material measure, and being sinusoidal, the measurement signals further being phase-displaced by 90° relative to one another, the material measure executing a relative motion of one graduation during one period of the measurement signals, an updating taking place concerning the graduation to which the measurement signals are currently allocated;

determining and storing measurement signal correction values per graduation as a function of the measurement signals acquired for this graduation so that given a later acquisition of measurement signals, a position angle within a then-scanned graduation is determined as a function of a then-determined rough angle and the intermediate correction values; and determining graduation-specific and rough-angle-specific intermediate correction values per graduation as a function of the measurement signals acquired for this graduation and as a function of the measurement signal correction values so that given the later acquisition of measurement signal, a position angle within the then-scanned graduation can be determined as a function of the then-determined rough angle and as a function of the intermediate correction values;

determining rough angle correction values that are rough-angle specific and graduation dependent as a function of the intermediate correction values so that given the later acquisition of measurement signals, as a function of the then-determined measurement signals and of a graduation to which the then-determined measurement signals are allocated, as a function of the measurement signal correction values and the rough angle correction values, the position angle can be determined within the graduation to which the then-acquired measurement signals are allocated, and a position signal can be determined from the position angle and the graduation to which the then-acquired measurement signals are allocated, the measurement signal correction values including at least graduation-specific fundamental values for amplitudes and offsets of the then-acquired measurement signals, and a phase displacement of the then-acquired measurement signals relative to one another.

* * * * *